(12) United States Patent
Zhu et al.

(10) Patent No.: US 6,404,954 B1
(45) Date of Patent: Jun. 11, 2002

(54) ANGLED-AXIS FIBER-OPTIC COUPLERS

(75) Inventors: Steven Guoxin Zhu, Fremont; Jingyu Xu, San Jose, both of CA (US)

(73) Assignee: Oplink Communications, Inc., San Jose, CA (US)

( * ) Notice: Subject to any disclaimer, the term of this patent is extended or adjusted under 35 U.S.C. 154(b) by 75 days.

(21) Appl. No.: 09/652,800

(22) Filed: Aug. 31, 2000

(51) Int. Cl.$^7$ ................................................. G02B 6/36
(52) U.S. Cl. .............................. 385/34; 385/33; 385/52; 385/78; 385/80
(58) Field of Search ................................ 385/31–35, 24, 385/49, 52, 60, 78, 79, 80, 93, 98, 99; 65/49–51, 65

(56) References Cited

U.S. PATENT DOCUMENTS

| | | | |
|---|---|---|---|
| 5,953,474 A | 9/1999 | Basavanhally | 385/60 |
| 6,023,542 A | 2/2000 | Pan et al. | 385/24 |
| 6,059,462 A | 5/2000 | Finak et al. | 385/73 |
| 6,148,126 A * | 11/2000 | Zheng | 385/34 |
| 6,168,319 B1 * | 1/2001 | Francis | 385/79 |
| 6,269,202 B1 * | 7/2001 | Lee et al. | 7/200 |

* cited by examiner

Primary Examiner—Hemang Sanghavi
(74) Attorney, Agent, or Firm—Lumen Intellectual Property Services

(57) ABSTRACT

This invention provides a novel class of fiber-optic couplers that enable fiber-optic elements in an angled-axis alignment to be coupled in a secure and reliable manner. The fiber-optic couplers of the present invention further permit a variable gap between two successive optical elements that are coupled. This has an important practical application, for it allows GRIN lenses with a pitch less than a quarter-pitch to be employed. By cascading and/or telescoping a plurality of these fiber-optic couplers, the present invention further provides an assembly of fiber-optic systems that can be utilized as wavelength division multiplexers and de-multiplexers. An important advantage of the fiber-optic couplers of the present invention is that they allow fiber-optic elements to be arranged in various ways, yet still attaining secure and reliable coupling. Another advantage of the fiber-optic couplers of the present invention is that the coupling is less susceptible to extraneous effects such as temperature variations and moisture erosion. Further advantages of the fiber-optic couplers of the present invention include their simple assembly, versatility, and adaptability for a variety of applications.

35 Claims, 5 Drawing Sheets

ANGLED-AXIS FIBER-OPTIC COUPLERS

FIELD OF THE INVENTION

This invention relates generally to optical couplers for fiber-optic systems. More particularly, it provides a novel type of coupling devices that permit fiber-optic components to be aligned in various ways, including an angled-axis alignment.

BACKGROUND ART

Fiber-optic networks are emerging as the transmission media of choice of telecommunications. Crucial to the performance of a fiber-optic network is the precise alignment and reliable coupling of various fiber-optic components, such as optical fiber carriers, GRIN lenses, and optical filters.

FIG. 1A depicts a method prevalent in the art for coupling optical fibers to a GRIN lens. By way of example, an optical fiber carrier in the form of a fiber holder 100, carrying two optical fibers 101, 102, and a GRIN lens 103 are brought together in close proximity and held in place by an epoxy joint 104. Both UV epoxy and high temperature epoxy are generally employed as the adhesive agent. In some applications, the assembly may involve a two-step process: a UV epoxy is applied first as a fixing to secure the alignment of two adjacent optical elements, such as fiber holder 100 and GRIN lens 103; and a high temperature epoxy is then added to further strengthen the coupling. Since the UV epoxy is considerably viscous, its application also serves to prevent the high temperature epoxy from spreading over to the sensitive optical surfaces.

The above prior art method of coupling fiber-optic elements renders several shortcomings, notably: 1) a bulky epoxy joint often cracks as ambient temperature fluctuates, due to different thermal expansion properties optical elements and epoxy may possess; and 2) moisture tends to degrade the performance of epoxy. Consequently, the alignment and the coupling between fiber-optic elements deteriorate over time, affecting the overall stability of the optical network. Moreover, because of the aforementioned problems inherent to epoxy, any gap between two fiber-optic elements bridged by epoxy, such as gap 105 between fiber holder 100 and GRIN lens 103 in FIG. 1A, must be small, which dictates that GRIN lens 103 in this case have a precise pitch, typically a quarter-pitch (0.25). This is an expensive, and at times impractical, proposition.

FIG. 1B provides an exaggerated depiction of the spatial arrangement between fiber holder 100 and GRIN lens 103 shown FIG. 1A. GRIN lens 103 is used to collimate and focus light beams 115, 116 emerging from fibers 101, 102 respectively to point 107 on its back-end face 108, so that light can be passed onto succeeding fiber-optic elements in the network. Because light refracts at a front-end face 109 of fiber holder 100 and subsequently at a front-end face 110 of GRIN lens 103, an axis 111 of GRIN lens 103 must be oriented at an angle θ, albeit small (typically about a few degrees), relative to an axis 112 of fiber holder 100, to ensure that light beams 115, 116 eventually converge to the designated location, point 107.

FIGS. 2A–2B show two other prior art fiber-optic couplers, disclosed in U.S. Pat. No. 6,023,542. In FIG. 2A, a fiber holder 33, carrying two optical fibers 30, 31, is enclosed in a quartz cylinder 46 on one end and coupled to a GRIN lens 34 by way of an epoxy 48 on the other. Cylinder 46 and GRIN lens 34 are further arranged to center in a cylindrical housing 47. Despite the presence of two cylindrical housings 46, 47 in this case, the coupling between fiber holder 33 and GRIN lens 34 relies nonetheless on epoxy 48, rendering it susceptible to the same shortcomings as described above. In the optical coupler shown in FIG. 2B, a GRIN lens 35 and a fiber holder 36 are bridged and held in place by a quartz cylinder 44, which is further telescoped within a second cylindrical housing 45. The physical arrangement in this system, however, does not permit fiber holder 36 and GRIN lens 35 to be aligned in such a way that their respective axes are oriented at an angle, such as the angled-axis alignment illustrated in FIG. 1B.

Hence, there is a need in the art for more effective, reliable, and versatile fiber-optic couplers that overcome the shortcomings of the prior art coupling devices.

OBJECTS AND ADVANTAGES

Accordingly, it is a primary object of this invention to present a novel class of fiber-optic couplers that enable fiber-optic elements in an angled-axis alignment to be coupled in a secure and reliable manner. It is another object of the present invention to permit a variable gap between two successive optical elements. It is a further object of the present invention to provide methods for coupling fiber-optic elements.

An important advantage of the fiber-optic couplers of the present invention is that they allow fiber-optic elements to be spatially arranged in various ways, yet still attaining secure and reliable coupling. Another advantage of the fiber-optic couplers of the present invention is that the coupling is less susceptible to extraneous effects such as temperature variations and moisture erosion. Moreover, by allowing a variable gap between two optical elements in a fiber-optic coupler of the present invention, a variety of GRIN lenses with less than a quarter-pitch can be employed, which is highly desirable in practice. Further advantages of the fiber-optic couplers of the present invention include their simple assembly, versatility, and adaptability for a variety of applications.

These and other objects and advantages of the present invention will become apparent from the following description and accompanying drawings.

SUMMARY OF THE INVENTION

The present invention provides a fiber-optical coupler in which two or more optical elements are bridged and held in place by a sleeve. A first side of the sleeve partially encompasses and is in contact with a first optical element, and a second side of the sleeve partially encompasses and is in contact with a second optical element via an adhesive agent. The length and the inner diameter of the bridging sleeve can be so chosen to allow the axes of the first and second fiber-optic elements to be oriented at an angle. Such an alignment is termed an angled-axis alignment, hereinafter.

The fiber-optic coupler of the present invention further permits a variable gap of empty space between the first and second optical elements. In an application where the first optical element is a fiber holder and the second optical element is a GRIN lens, for instance, the allowance of a gap permits a GRIN lens with less than a quarter-pitch to be used. In addition, there can be one or more optical elements sandwiched between the first and second optical elements.

By choosing a sleeve having thermal expansion properties and geometrical attributes that closely match those of the optical elements it embraces, the coupling between the optical elements in the fiber-optic coupler of the present invention is much less susceptible to ambient temperature variations and moisture erosion, hence more reliable and enduring.

The bridging sleeve is typically made of glass, or metal (e.g., stainless steel). The inner cross-section (i.e., the cross-section of the hollow interior) of the sleeve may have varying shape and size along a length of the sleeve, so as to correspond to the geometric attributes of the optical elements it contains. The adhesive agent can be an epoxy, or a solder. Both UV and high temperature epoxies are typically employed. The optical elements that are to be coupled can be optical fiber holders (or connectors), GRIN lenses, optical isolators, and optical filters, etc.

A plurality of the fiber-optic couplers described above can be further cascaded, providing a secure and reliable way of interconnecting a variety of optical elements which may require different alignments. Moreover, two or more fiber-optic couplers, in simple or cascaded form, can be telescoped within and bridged by one or more additional sleeves, to further facilitate the interconnections in a fiber-optical network.

The novel features of the present invention will be best understood from the following drawings and detailed description.

DETAILED DESCRIPTION

Although the following detailed description contains many specifics for the purposes of illustration, anyone of ordinary skill. in the art will appreciate that many variations and alterations to the following details are within the scope of the invention. Accordingly, the following preferred embodiment of the invention is set forth without any loss of generality to, and without imposing limitations upon, the claimed invention.

Figure 3:
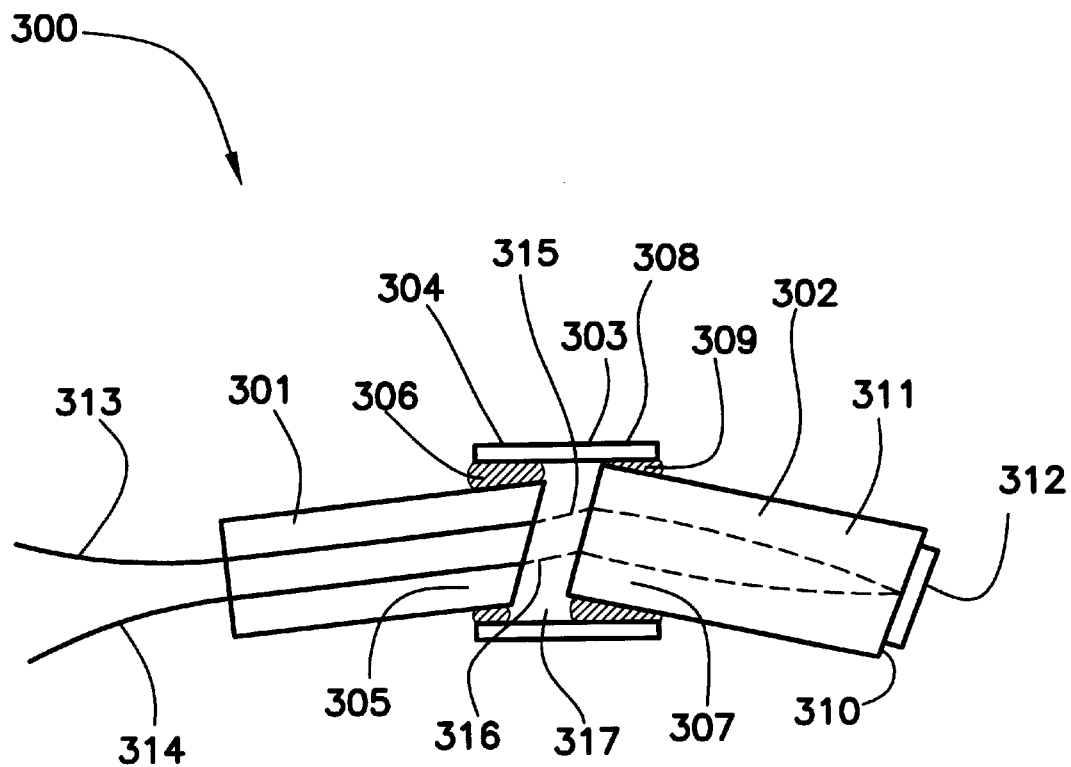
FIG. 3 depicts an exemplary embodiment of a first optical coupler according to the present invention.

FIG. 3 depicts an exemplary embodiment of a first fiber-optic coupler according to the present invention. By way of example, fiber-optic coupler 300 comprises a fiber holder 301 and a GRIN Lens 302 bridged by a sleeve 303. Fiber holder 301 carries two optical fibers 313, 314, from which two light beams 315, 316 emerge. A first side 304 of sleeve 303 encompasses and is in contact with an end-section 305 of fiber holder 301 via a first adhesive agent 306. A second side 308 of sleeve 303 encompasses and is in contact with a first end-section 307 of GRIN lens 302 via a second adhesive agent 309. Attached to an end-face 310 of a second end-section 311 of GRIN lens 302 is an optical filter 312. The length and the inner diameter of sleeve 303 are so chosen that fiber holder 301 and GRIN lens 302 are allowed to be positioned in an angled-axis alignment, as the exaggerated depiction in FIG. 3 illustrates.

In the above embodiment, bridging sleeve 303 is typically made of glass, or metal (e.g., stainless steel). Either of first and second adhesive agents 306, 309 can be an epoxy, or a solder, and they are generally of the same type for the ease of assembly. In general, bridging sleeve 303 should be so selected that its coefficient of thermal expansion closely matches the coefficients of thermal expansion of the optical elements it embraces. In this way the epoxy or solder joint between the sleeve and the optical elements is much less susceptible to variations in ambient temperature and moisture erosion, ensuring a stronger and more enduring coupling.

As a way of example, fiber-optic coupler 300 (and the like) may be assembled by using the following steps: fiber holder 301 and GRIN lens 302 are first brought into close proximity and bridged by sleeve 303; a UV epoxy is then applied to the contact regions between sleeve 303 and fiber holder 301, and between sleeve 303 and GRIN lens 302; after the alignment between fiber holder 301 and GRIN lens 302 is further adjusted to ensure the requisite angled-axis arrangement, UV epoxy is then set by exposure to a UV light. In some cases, a high temperature epoxy may be added to the contact regions to further strengthen the coupling.

Figure 1A:
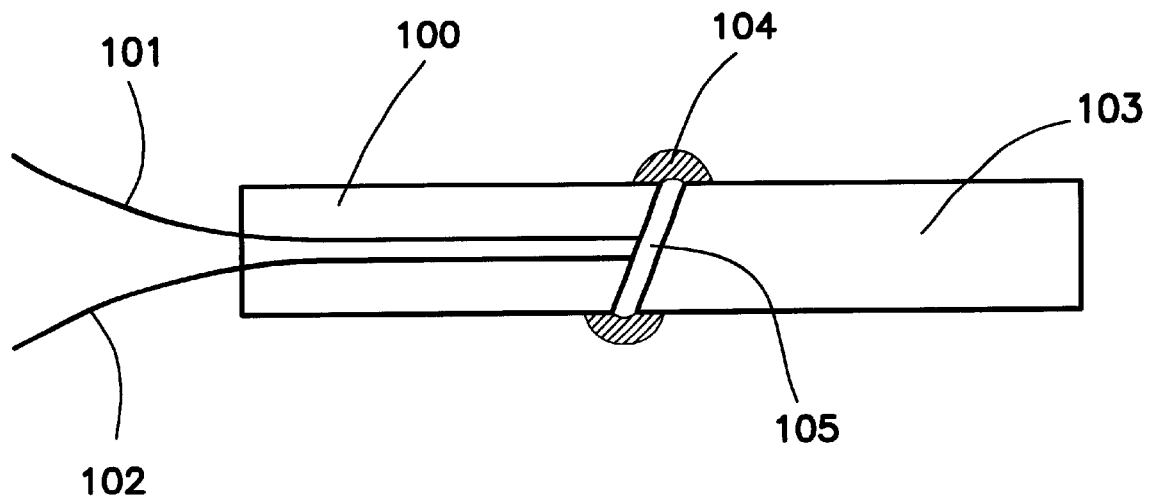
FIGS. 1A–1B show a prior art method for coupling fiber-optic elements and an exaggerated depiction of the spatial arrangement between a fiber holder and a GRIN lens.
Figure 1B:
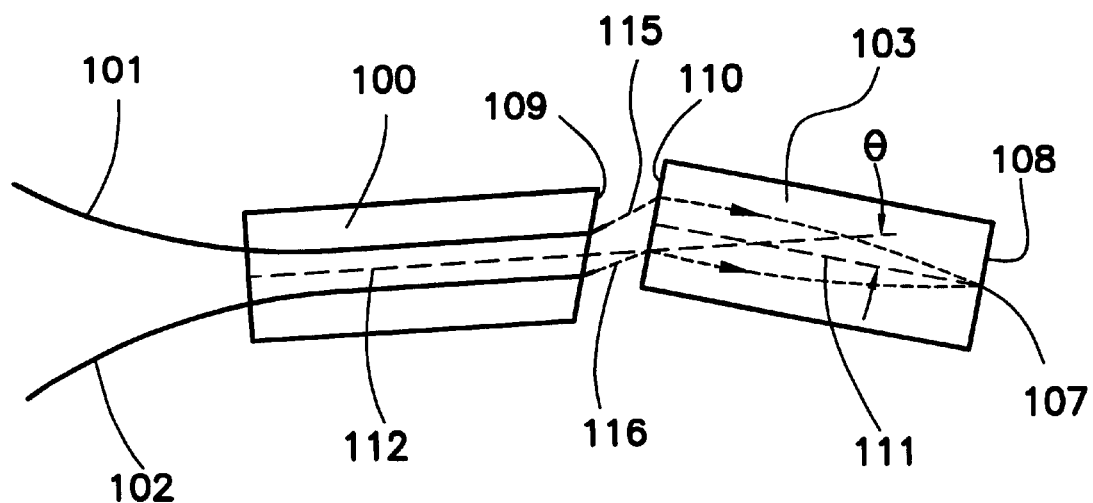
Figure 2A:
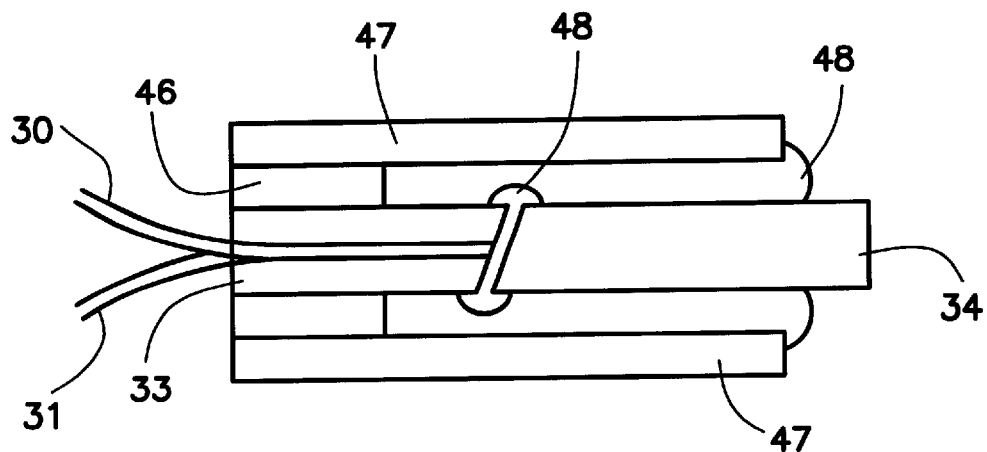
FIGS. 2A–2B show two prior art fiber-optic couplers.
Figure 2B:
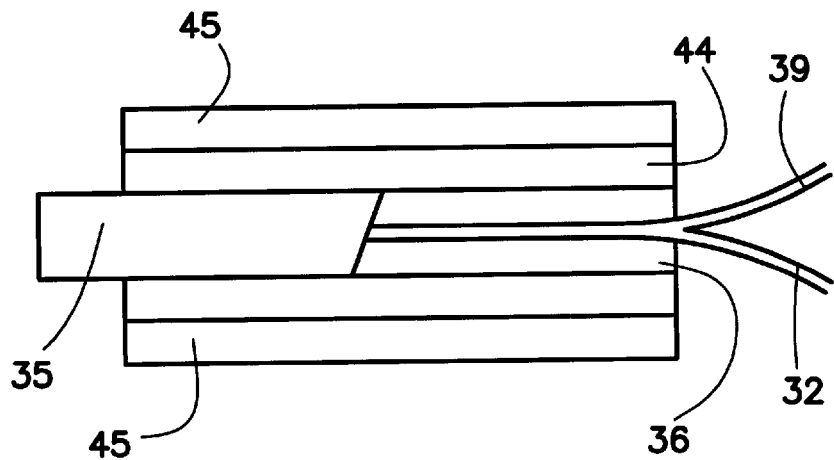

A notable feature of optical coupler 300 shown in FIG. 3 is that there can be a gap 317 of variable size between fiber holder 301 and GRIN lens 302, which would not be obtainable using the prior art method of coupling, as shown in FIG. 1A or FIG. 2A. This is desirable, for it allows GRIN lens 302 to have a pitch (e.g., 0.22) less than a quarter-pitch. That is, the size of gap 317 can be so chosen that a combination of gap 317 and GRIN lens 302 is operationally equivalent to a GRIN lens with a quarter-pitch.

Alternatively, there can also be one or more auxiliary optical elements, such as one or more optical filters, sandwiched between fiber holder 301 and GRIN lens 302.

Figure 4:
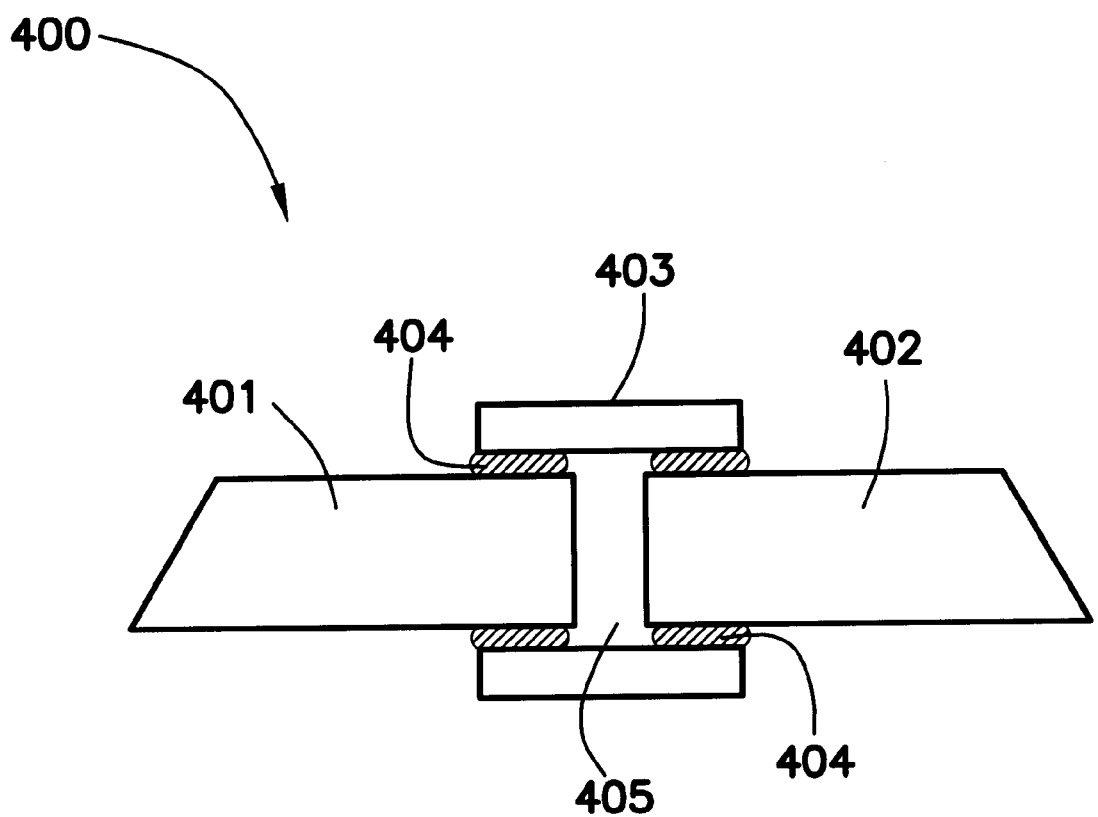
FIG. 4 shows an exemplary embodiment of a second optical coupler according to the present invention.

FIG. 4 shows an exemplary embodiment of a second fiber-optic coupler of the present invention. Fiber-optic coupler 400 comprises a first GRIN lens 401 and a second GRIN lens 402 bridged by a sleeve 403. The contact regions between sleeve 403 and GRIN lenses 401, 402 are secured by an adhesive agent 404, which may be in the form of epoxy. A gap 405 between first and second GRIN lenses 401, 402 can be varied. For example, if either or both of first and second GRIN lenses 401, 402 have a pitch less than a quarter-pitch, the size of gap 405 can be such that the combination of gap 405 and GRIN lenses 401, 402 operationally yields a GRIN lens of a half-pitch. Alternatively, one or more auxiliary optical elements can be sandwiched between first and second GRIN lenses 401, 402.

Figure 5:
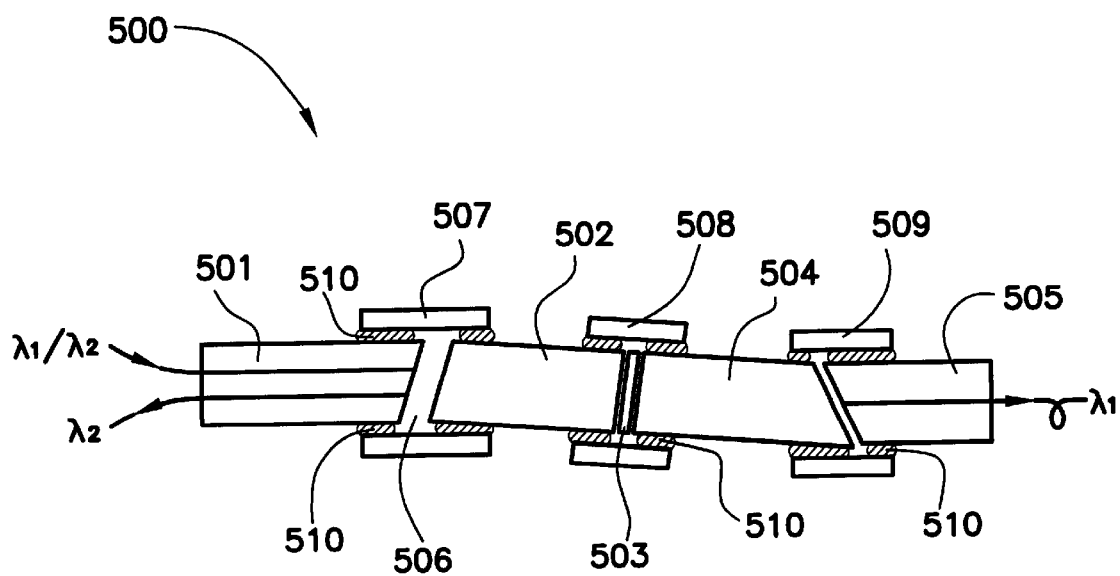
FIG. 5 illustrates a schematic depiction of an exemplary fiber-optic apparatus according to the present invention.

FIG. 5 illustrates a schematic depiction of an exemplary fiber-optic apparatus according to the present invention. As a way of example to illustrate the utility of the present invention, fiber-optic apparatus 500 comprises a first fiber holder 501, a first GRIN lens 502, an optical filter 503, a second GRIN lens 504, and a second fiber holder 505. First fiber holder 501 and first GRIN lens 502, separated by a gap 506, are bridged by a first sleeve 507. First GRIN lens 502 and second GRIN lens 504, with optical filter 503 sandwiched in between, are in turn bridged by a second sleeve 508. Second GRIN lens 504 is then coupled to second fiber holder 505 by a third sleeve 509. The contact regions between each bridging sleeve and its corresponding fiber-optic elements are secured by an adhesive agent 510. The lengths and sizes of bridging sleeves 507, 508, 509 are so chosen to permit different alignments among the constituent GRIN lenses and fiber holders. Moreover, in the situation where first GRIN lens 502 has a pitch less than a quarter-pitch, e.g., 0.20, the size of gap 506 can be such that a combination of gap 506 and first GRIN lens 502 is operationally equivalent to a GRIN lens with a quarter-pitch. As such, the exemplary embodiment of fiber-optic apparatus 500 depicted in FIG. 5 may serve as a wavelength division multiplexer (WDM) or de-multiplexer.

Bridging sleeves 507, 508, 509 in the above embodiment can be made of glass, or metal, or a combination of both. Adhesive agent 510 can be an epoxy, such as UV or high temperature epoxy, or a solder. Although the same type of adhesive agent is generally applied to all the contact regions for the ease of assembly, different kinds of adhesive agent may also be used. Optical filter 503 can be a long-pass filter, a short-pass filter, or a band-pass filter. Such filters are commonly used in WDM modules, optical interleavers, optical routers, and the like.

A skilled artisan will recognize that the exemplary fiber-optic apparatus 500 illustrated in FIG. 5 may be further cascaded with additional fiber-optic elements coupled by bridging sleeves. Furthermore, two or more fiber-optic couplers of the present invention, as exemplified in FIGS. 3–4, can be telescoped within one or more additional bridging sleeves.

It is clear to those skilled in the art that the above exemplary embodiments of the fiber-optic couplers of the present invention are provided for illustration purposes, to elucidate the general principle and the utility of the present invention. Various changes, substitutions, and alterations can be made herein without departing from the principle and the scope of the present invention. Accordingly, the scope of the invention should be determined by the following claims and their legal equivalents.

What is claimed is:

1. A fiber-optic coupler comprising:
   a) a fiber holder for holding one or more optical fibers, wherein said fiber holder has an end-section;
   b) a GRIN lens having first and second end-sections; and
   c) a bridging sleeve, wherein a first side of said sleeve encloses and is in contact with said end-section of said fiber holder via a first adhesive agent, and wherein a second side of said sleeve encloses and is in contact with said first end-section of said GRIN lens via a second adhesive;
wherein a length and an inner diameter of said bridging sleeve are such to permit an axis of said fiber holder to be oriented at an angle with respect to an axis of said GRIN lens.

2. The fiber-optic coupler of claim 1 further comprising a gap formed between an end-face of said end-section of said fiber holder and an end-face of said first end-section of said GRIN lens.

3. The fiber-optic coupler of claim 2 wherein said GRIN lens has a pitch less than a quarter-pitch, and wherein a size of said gap is such that a combination of said gap and said GRIN lens is operationally equivalent to a GRIN lens with a quarter-pitch.

4. The fiber-optic coupler of claim 1 further comprising one or more auxiliary optical elements sandwiched between an end-face of said end-section of said fiber holder and an end-face of said first end-section of said GRIN lens.

5. The fiber-optic coupler of claim 4 wherein said one or more auxiliary optical elements comprise an optical filter.

6. The optical coupler of claim 5 wherein said optical filter comprises an element selected from the group consisting of long-pass filters, short-pass filters, and band-pass filters.

7. The fiber-optic coupler of claim 1 wherein said bridging sleeve is made of a material selected from the group consisting of glass and metal.

8. The fiber-optic coupler of claim 1 wherein a coefficient of thermal expansion of said sleeve closely matches the respective coefficients of thermal expansion of said fiber holder and said GRIN lens.

9. The fiber-optic coupler of claim 1 wherein said first and second adhesive agents comprise one or more materials selected from the group consisting of high temperature epoxy, UV epoxy, and solder.

10. The fiber-optic coupler of claim 1 further comprising an optical filter attached to an end-face of said second end-section of said GRIN lens.

11. The fiber-optic coupler of claim 10 wherein said optical filter comprises an element selected from the group consisting of long-pass filters, short-pass filters, and band-pass filters.

12. The fiber-optic coupler of claim 1 further comprising:
   a) a second GRIN lens having first and second end-sections; and
   b) a second bridging sleeve;
wherein a first side of said second sleeve encloses and is in contact with said second end-section of said first GRIN lens via a third adhesive agent, and wherein a second side of said second sleeve encloses and is in contact with said first end-section of said second GRIN lens via a fourth adhesive agent.

13. The fiber-optic coupler of claim 12 further comprising one or more auxiliary optical elements sandwiched between an end-face of said second end-section of said first GRIN lens and an end-face of said first end-section of said second GRIN lens.

14. The fiber-optic coupler of claim 13 wherein said one or more auxiliary optical elements comprise an optical filter.

15. The fiber-optic coupler of claim 14 wherein said optical filter comprises an element selected from the group consisting of long-pass filters, short-pass filters, and band-pass filters.

16. The fiber-optic coupler of claim 12 further comprising a gap formed between an end-face of said second end-section of said first GRIN lens and an end-face of said first end-section of said second GRIN lens.

17. The fiber-optic coupler of claim 16 wherein said gap is so chosen that a combination of said first GRIN lens, said gap, and said second GRIN lens is operationally equivalent to a GRIN lens with a half-pitch.

18. The fiber-optic coupler of claim 12 wherein said second sleeve is made of a material selected from the group consisting of glass and metal.

19. The fiber-optic coupler of claim 12 wherein a coefficient of thermal expansion of said second sleeve closely matches the respective coefficients of thermal expansion of said first and second GRIN lenses.

20. The fiber-optic coupler of claim 12 wherein said third and fourth adhesive agents comprise one or more materials selected from the group consisting of high temperature epoxy, UV epoxy, and solder.

21. The fiber-optic coupler of claim 12 wherein said axis of said first GRIN lens and an axis of said second GRIN lens are oriented at an angle.

22. The fiber-optic coupler of claim 12 further comprising:
   a) a second fiber holder for holding one or more optical fibers, wherein said second fiber holder has an end-section; and
   b) a third bridging sleeve;
wherein a first side of said third sleeve encloses and is in contact with said second end-section of said second GRIN lens via a fifth adhesive agent, and wherein a second side of said third sleeve encloses and is in contact with said end-section of said second fiber holder via a sixth adhesive agent.

23. The fiber-optic coupler of claim 22 further comprising a gap formed between an end-face of said second end-section of said second GRIN lens and an end-face of said end-section of said second fiber holder, and wherein said gap is so chosen that a combination of said second GRIN lens and said gap is operationally equivalent to a GRIN lens with a quarter-pitch.

24. The fiber-optic coupler of claim 22 wherein said third bridging sleeve is made of a material selected from the group consisting of glass and metal.

25. The fiber-optic coupler of claim 22 wherein said fifth and sixth adhesive agents comprise one or more materials selected from the group consisting of UV epoxy, high temperature epoxy, and solder.

26. The fiber-optic coupler of claim 22 wherein a coefficient of thermal expansion of said third bridging sleeve closely match the respective coefficients of thermal expansion of said second GRIN lens and said second fiber holder.

27. The fiber-optic coupler of claim 22 wherein an axis of said second GRIN lens and an axis of said second fiber holder are positioned at an angle.

28. A method for coupling optical elements, comprising:
   a) bringing two or more optical elements, including a first optical element and a second optical element, to a close proximity;
   b) bridging said two or more optical elements with a bridging sleeve, wherein a first side of said sleeve encloses an end-section of said first optical element and a second side of said sleeve encloses an end-section of said second optical element;
   c) aligning said first and second optical elements such that an axis of said first optical element is oriented at an angle with respect of an axis of said second optical element; and
   d) securing said sleeve to said end-section of said first optical element with a first adhesive agent, and said sleeve to said end-section of said second optical element via a second adhesive agent.

29. The method of claim 28 wherein said step a) is carried out such that there is a sizable gap formed between an end-face of said end-section of said first optical element and an end-face of said end-section of said second optical element.

30. The method of claim 29 wherein said first optical element is a fiber holder containing one or more optical fibers, wherein said second optical element is a GRIN lens, and wherein said gap is so chosen that a combination of said gap and said GRIN lens is operationally equivalent to a GRIN lens with a quarter-pitch.

31. The method of claim 28 wherein said step a) is carried out such that a third optical element is sandwiched between an end-face of said end-section of said first optical element and an end-face of said end-section of said second optical element.

32. The method of claim 31 wherein said third optical element is an optical filter.

33. The method of claim 28 further comprising the step of applying a UV epoxy to hold said first and second optical elements in their approximate positions before carrying out said step c), and wherein said step d) comprises the step of hardening said UV epoxy by exposure to a UV light.

34. The method of claim 28 further comprising the step of applying a UV epoxy to hold said first and second optical elements in their approximate positions before carrying out said step c), and wherein said step d) comprises using a high temperature epoxy as said third and fourth adhesive agents.

35. The method of claim 28 further comprising the step of matching a coefficient of thermal expansion of said sleeve with the respective coefficients of thermal expansion of said first and second optical elements.

* * * * *